US012242412B2

(12) United States Patent
Regupathy et al.

(10) Patent No.: US 12,242,412 B2
(45) Date of Patent: Mar. 4, 2025

(54) APPARATUS AND METHODS FOR UNIVERSAL SERIAL BUS 4 (USB4) DATA BANDWIDTH SCALING

(71) Applicant: Intel Corporation, Santa Clara, CA (US)

(72) Inventors: Rajaram Regupathy, Bangalore (IN); Reuven Rozic, Einyamina (IL); Dmitriy Berchanskiy, Rocklin, CA (US); Nirmala Bailur, Bangalore (IN); Vrukesh V. Panse, Bangalore (IN); Saranya Gopal, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 18/194,262

(22) Filed: Mar. 31, 2023

(65) Prior Publication Data

US 2024/0330230 A1    Oct. 3, 2024

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 8,284,210 | B1 * | 10/2012 | Kumar | G09G 3/20 345/530 |
| 10,636,356 | B1 * | 4/2020 | Qian | G09G 3/3233 |
| 2015/0046622 | A1 | 2/2015 | Ramirez et al. | |
| 2020/0320026 | A1 | 10/2020 | Kabiry et al. | |
| 2021/0149441 | A1 * | 5/2021 | Bartscherer | G06F 1/1616 |
| 2021/0218845 | A1 * | 7/2021 | Magi | G06F 3/013 |
| 2021/0248973 | A1 * | 8/2021 | Jeon | G09G 5/005 |
| 2023/0096774 | A1 | 3/2023 | Regupathy et al. | |

OTHER PUBLICATIONS

EPO European Extended Search Report in EP Application Serial No. 23213816.4 mailed on Jun. 12, 2024, 9 pages.

* cited by examiner

*Primary Examiner* — Farley Abad
*Assistant Examiner* — Dayton Lewis-Taylor
(74) *Attorney, Agent, or Firm* — Alliance IP, LLC

(57) ABSTRACT

A data scaling module for USB4 that embodies display driver (DD) and connection manager (CM) operations. Periodic and aperiodic transfer requests are monitored. The periodic BW activity on periodic peripherals, such as display panels (DPs) is monitored, and determinations as to reduced periodic activity on a DP are made. Responsive to receiving a high aperiodic bandwidth request, the original refresh rate for the DP is reduced. The newly freed USB4 BW is provided for the aperiodic task. At completion of the aperiodic task, the DD increases the refresh rate to its original value.

17 Claims, 8 Drawing Sheets

APPARATUS AND METHODS FOR UNIVERSAL SERIAL BUS 4 (USB4) DATA BANDWIDTH SCALING

BACKGROUND

Technology evolution USB4 introduced a connection-oriented, tunneling architecture to combine multiple bus protocols (e.g., legacy USB, peripheral component interconnect express (PCIe), display panel (DP), host-to-host, and etc.) onto a single physical interface (referred to herein as a "port"). The USB4 architecture enables that the total bus speed and bandwidth performance of the USB4 fabric can be dynamically shared, not just between USB devices, but also with/between PCIe or DP endpoints. A major portion of the fixed available USB4 BW is provided to periodic BW consumers, such as display panels (DPs), leaving aperiodic data tasks, such as accessing storage or the network, to operate with only the remaining bandwidth. Accordingly, improvements to the utilization of USB4 BW are desirable.

DETAILED DESCRIPTION

Figure 1:
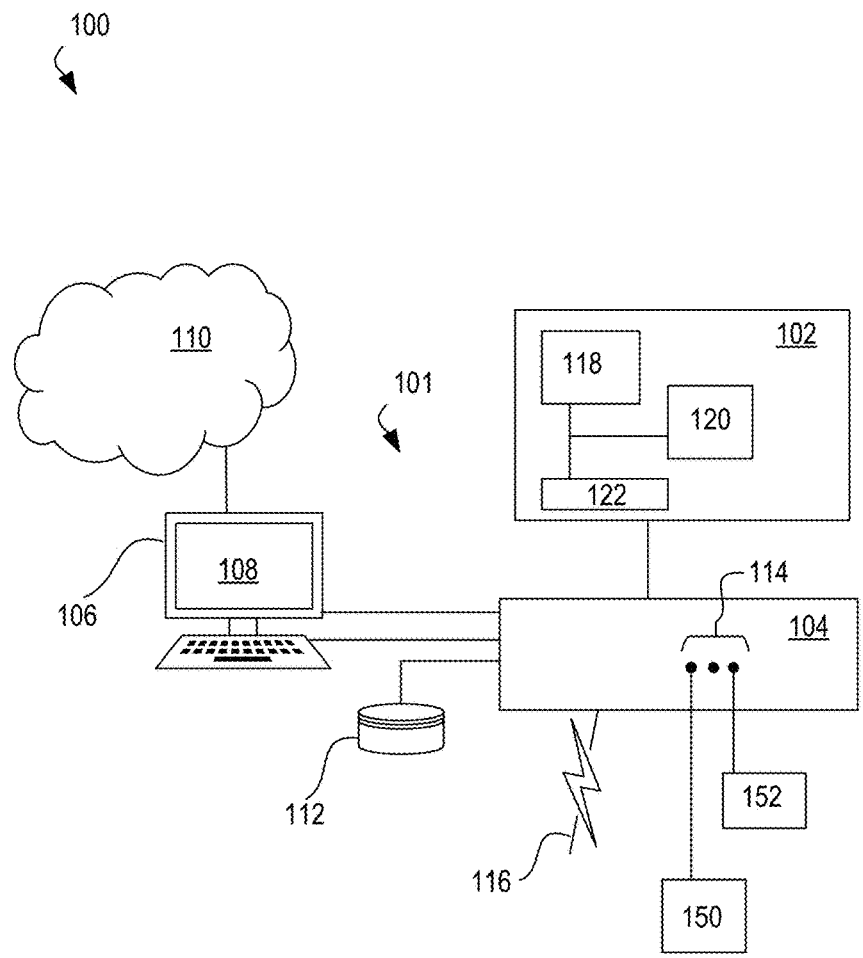
FIG. 1 is a simplified technology environment in which embodiments of the present disclosure may be implemented.

The Universal Serial Bus (USB) has evolved over more than a decade as a ubiquitous interface for peripherals to connect peripherals to a computer system. The evolution of USB bus speed went from 1.5 megabits per second (Mbps) in the USB 1.1 specification to 10 gigabits per second (Gbps) in the USB 3.1 specification. With the introduction of USB Type-C classification and associated power delivery specifications (USBC), USB functionality was expanded to include power and display panels (DPs). The USBC port increased the bandwidth to 20 Gbps with the introduction of the USB 3.2 specification. The various USB class specifications define advancements in respective functionalities and/or bandwidths; in tandem, the USB compatible hardware has evolved to take advantage of the increases in bandwidth to provide a better user experience and leverage the capability of the USB.

Technology evolution USB4 introduced a connection-oriented, tunneling architecture to combine multiple bus protocols (e.g., legacy USB, peripheral component interconnect express (PCIe), display panel (DP), host-to-host, and etc.) onto a single physical interface (referred to herein as a "port"). The USB4 architecture enables so that the total bus speed and bandwidth performance of the USB4 fabric can be dynamically shared, not just between USB devices, but also with/between PCIe or DP endpoints. The USB4 bandwidth is expanded to 40 Gbps (Gen 3.2), when implemented over a Type-C connector.

In various scenarios, an end user may use a USB4 dock to connect displays, storage, and a network to achieve a data-intensive and high-quality display work environment. In a non-limiting example, the user's environment has multiple high-resolution displays (DPs), respective DPs configured to receive the maximum tunnel bandwidth (BW). A major portion of the fixed available BW is provided to the periodic display data for the DPs, leaving aperiodic data tasks, such as accessing storage or the network, to operate with only the remaining bandwidth. In this user's environment, a technical problem is presented when the user wants to quickly perform an aperiodic bulk data transfer task (e.g., to copy content from the computing system to a local storage device, or to sync collaborative content from a cloud storage), because the available tunnel bandwidth is mostly consumed by periodic data transfers in support of the operation of the multiple DPs. This technical problem manifests as a poor user experience, in the form of a slower copy or sync operation than expected or desired. Especially in the current cloud and data centric world, it is desirable to provide a better user experience and a faster copy that is perceptibly seamless when using USB4. In summary, a technical problem with USB4 is a lack of methods or apparatuses to share or dynamically scale data BW between periodic tasks and aperiodic tasks to improve system performance and user experience.

Aspects of the present disclosure provide a technical solution to this technical problem and other related enhancements, in the form of apparatuses and methods for USB4 data bandwidth scaling. The herein provided apparatuses and methods share or dynamically scale USB4 data BW between periodic tasks and aperiodic tasks to improve performance of USB4 tunneled protocols.

Embodiments can be detected with a visual inspection of the operation of a product or underlying code itself, to look for the dynamic scaling of the bandwidth responsive to an aperiodic task. A throughput indication that matches peak performance of the aperiodic operation or survivability scenarios described herein can also indicate use of aspects of the present disclosure. A more detailed description of the aspects of the present disclosure follows a terminology section.

Terminology

As used herein, a "computing system" refers to any of a variety of computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

As used herein, the terms "processor unit", "processing unit" or "processor" may refer to any device or portion of a device that processes electronic data from registers and/or memory to transform that electronic data into other electronic data that may be stored in registers and/or memory. A processor unit may be a system-on-a-chip (SOC), and/or include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

As used herein, the term "module" refers to logic that may be implemented in a hardware component or device, software or firmware running on a processor unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processor units, state machine circuitry, and/or firmware that stores instructions executable by programmable circuitry. Modules described herein may, collectively or individually, be embodied as circuitry that forms a part of a computing system. Thus, any of the modules can be implemented as circuitry, such as continuous itemset generation circuitry, entropy-based discretization circuitry. A computing system referred to as being programmed to perform a method can be programmed to perform the method via software, hardware, firmware, or combinations thereof.

Terms or values modified by the word "substantially" include arrangements, orientations, spacings, or positions that vary by plus or minus 20% (inclusive) from the meaning of the unmodified term or value. Terms or values modified by the word "about" include values inclusive of 10% less than the term or value to inclusive of 10% greater than the term or value.

DESCRIPTION OF ASPECTS OF THE PRESENT DISCLOSURE

Example embodiments are hereinafter described in conjunction with the following drawing figures, wherein like numerals denote like elements. Figures are not necessarily to scale. As may be appreciated, certain terminology, such as "upper,", "uppermost", "lower," "above," "below," "bottom," and "top" refer to directions based on viewing the Figures to which reference is made. Further, terms such as "front," "back," "rear,", "side", "vertical", and "horizontal" may describe an orientation and/or location within a consistent but arbitrary frame of reference which is made clear by reference to the text and the associated Figures describing the component under discussion. Such terminology may include the words specifically mentioned above, derivatives thereof, and words of similar import. For the sake of brevity, well-known structures and devices may be shown in block diagram form to facilitate a description thereof.

FIG. 1 is a simplified technology environment 100 in which a system 101 for USB4 data bandwidth scaling may be implemented. The system 101 includes a USB4 docking component 104 (simplified hereinafter to docking component 104). The docking component 104 may include a plurality of additional ports 114. The ports 114 support communication with any of a variety of "add-on" devices or "peripherals" that have been developed to work with USB4 and to provide communication with a computer, a network, or the cloud. Examples of such add-on devices 150/250, 152/252 include, audio players, joysticks, keyboards, digital cameras, Scanners, video game consoles, portable digital assistants, (PDAs), portable digital video disk (DVD) and media players, cell phones, televisions (TVs), home/automobile stereo equipment, portable memory devices, and the like.

In order to support these different kinds of peripherals or add-on devices 150/250, 152/252, respective ports 114 may require different types of adapters for different types of data transfers, such as, but not limited to control, bulk, isochronous and interrupt. Isochronous transfers and interrupt transfers are periodic transfers while control transfers and bulk transfers are aperiodic. Further, the docking component 104 may support both wired and wireless 116 communication protocols.

In environment 100, the docking component 104 is in operable communication with a dynamic data scaling module 102, a computing system 106, a storage component 112, and a display panel (DP) 108. The computing system 106 can be any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). In various embodiments, the computing system 106 and/or the docking component 104 may additionally be in operable communication with a network or cloud 110.

The dynamic scaling module 102 may be implemented as software or as hardware. In an example, the dynamic scaling module 102 may be implemented as program code stored in memory 120, the program code, when executed by the processor 118, communicates through a communication fabric 122 to cause components of the system 101 to perform the tasks attributed to it herein. In an alternative example, the dynamic scaling module 102 may be implemented as hardware, as a system on chip, as a multi-die assembly, as a chipset, or similar. In other embodiments, the dynamic scaling module 102 may be integrated into the hardware and/or the software of the docking component 104, or the dynamic scaling module 102 may be integrated into the hardware and/or the software of the computing system 106.

Figure 2:
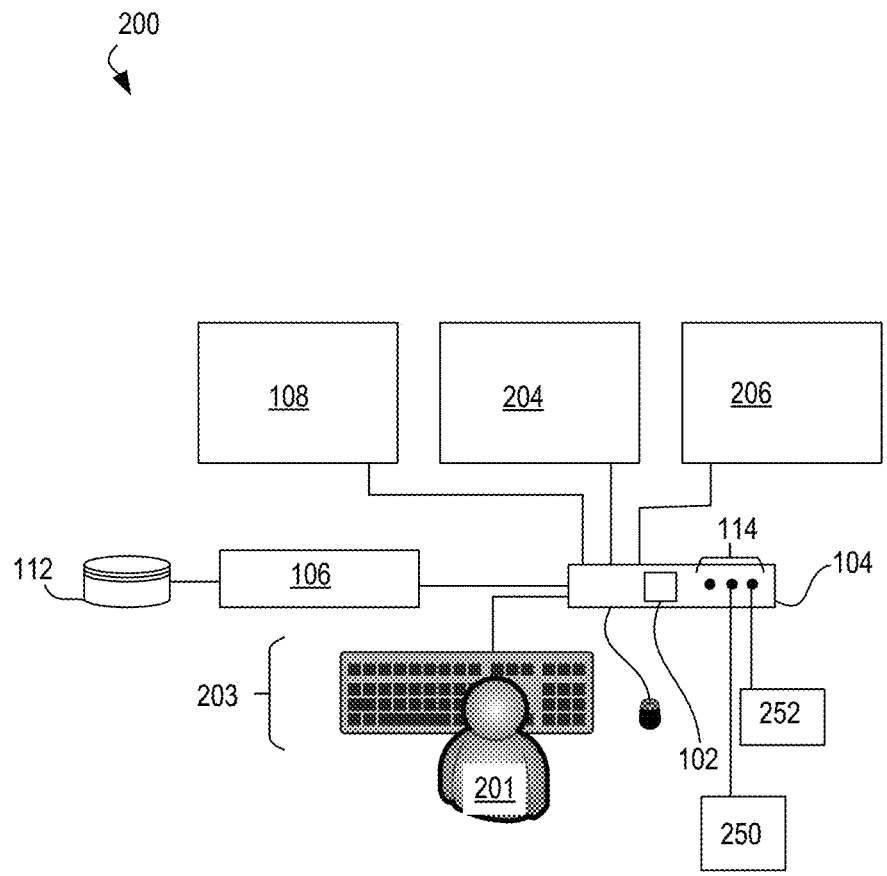
FIG. 2 illustrates an example use case illustrating advantages provided by embodiments of the present disclosure.

FIG. 2 illustrates an example use case. In technology environment 200, a user 201 may interact with the dynamic scaling module 102 and the docking component 104 through a human machine interface (HMI 203). The illustrated HMI 203 depicts a keyboard and a mouse, although in other embodiments, the HMI 203 may include a microphone, a speaker, and a camera, and may operate on voice commands, touch input, gesture control, or any combination thereof. Individual HMI 203 components may be independently connected to the docking component 104. One or more additional display panels (DP 204 and DP 206) are shown, in addition to DP 108.

As used herein, a "path" is a one-way logical connection between two adapters. There are two types of paths: a protocol adapter to protocol adapter path and a connection manager to control adapter. Paths represent a virtual wire for a tunneled protocol, and paths have packet headers for identification.

As used herein, a "tunnel" is a logical connection between two USB4 products. In display panel and host-to-host tunneling, a tunnel is one end-to-end path. For USB3 and PCIe tunneling, a tunnel is a series of paths. In USB4, a router is enumerated and then a tunnel is configured end-to end before data transfer can take place.

A USB host controller schedules both the periodic transfers and the aperiodic transfers in the available USB bus bandwidth. As defined by the USB4 specification, the periodic transfer gets definite service priority on the USB4 and the aperiodic transfer (such as, a bulk transfer) is scheduled using a round robin scheduling method. The latter is done in a best effort format and would be the fastest transfer on an otherwise idle bus.

USB4 further adds a 3-level scheduling scheme for each level of tunneled path. All paths (except a high priority Path0) are grouped into 7 priority groups, and within each group every path is provided a weight. So, the scheduling of packet transactions happens such that the highest priority group is scheduled first, and within that group, a weighted round robin is followed, such that, a path with weight X has X packets scheduled for it in that round. For a fuller understanding of the USB4 specification, a variety of resources can be referenced, for example, the USB organization website[1].

Figure 3:
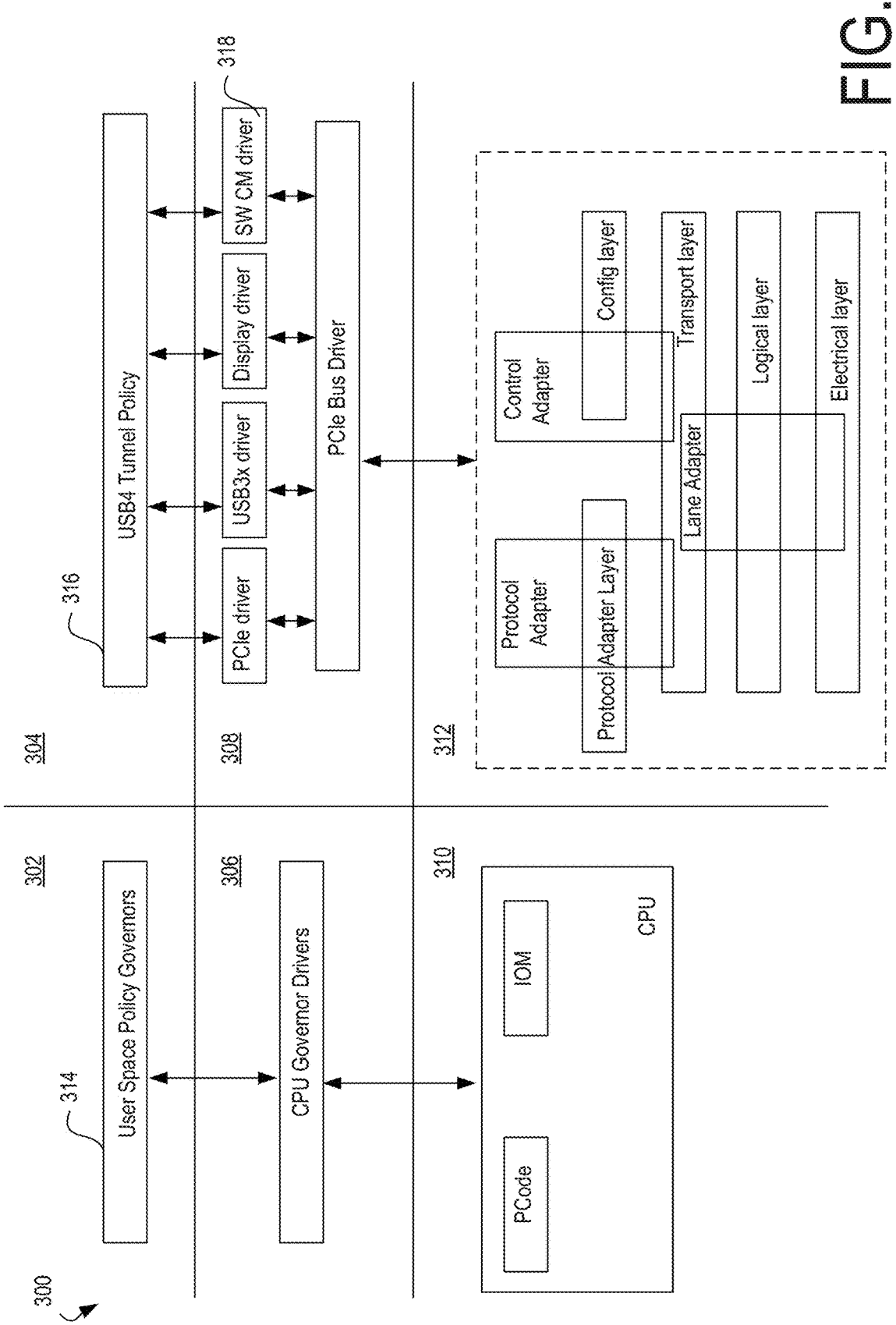
FIG. 3 represents tunnel protocols without enhancements provided by embodiments.
Figure 4:
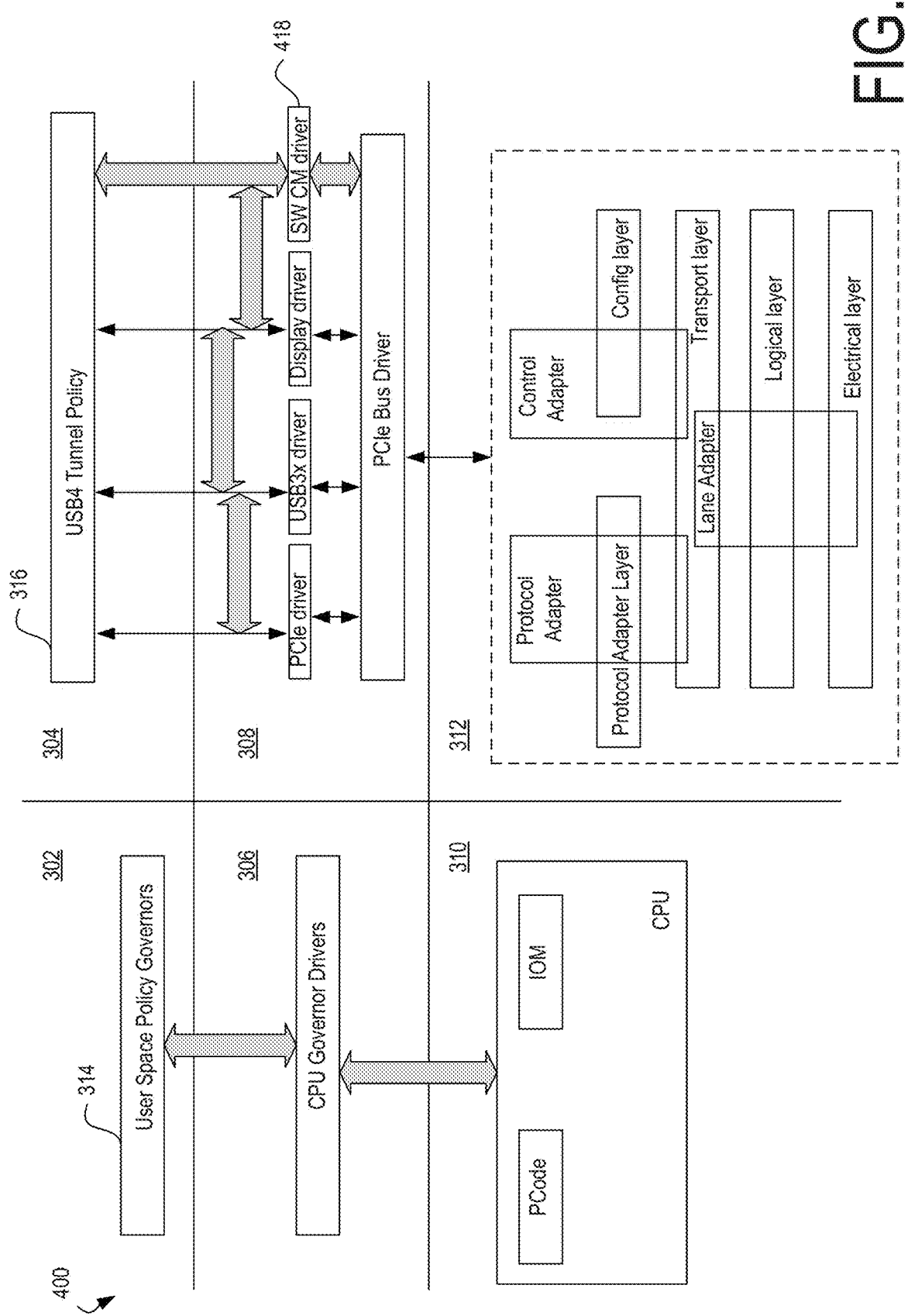
FIG. 4 represents tunnel protocols with enhancements provided by embodiments.

With reference to FIG. 3 and FIG. 4, the protocol tunneling priorities are managed at a higher-level layer by a Connection Manager (CM) 318 which is typically implemented as operating system driver or system firmware integrated within the computing system platform. The CM 318 is responsible for managing various aspects of the tunneled protocol including bandwidth and power. For example, the CM 318 prioritizes the protocols in the order of DP. USB, PCIe as follows:

Guaranteed bandwidth (BW) cannot be taken away by a CM unless a consumed bandwidth and a semaphore mechanism to alert a user are present.

When a display panel (DP) tunneling path is being established, a CM tries to allocate the maximum supported DP BW.

USB3 BW is dynamic—meaning that free/available BW is allocated to USB3 tunneling.

USB3 BW is allocated a higher priority for free/available BW than PCIe tunneling.

Display panels (DP) are often configured to operate at one or more different refresh rates, and a display driver (DD) will typically switch the refresh rate for the DP, dynamically, responsive to variables such as, an application that is running, a DP usage rate, and a determination as to whether the DP is operating on a battery power supply. Reducing the refresh rate for the DP can save power, although reducing the refresh rate can also significantly reduce the data rate or BW.

Although USB4 allows the DD and the CM to cooperate to allocate and deallocate BW for DPs, USB4 does not define a method for relinquishing BW for non-display panel (aperiodic) tasks. FIG. 3 represents tunnel protocols 300 without enhancements provided by embodiments.

It is helpful to view FIG. 3 and FIG. 4 side by side. FIG. 4 represents tunnel protocols 400 enhanced with CPU hooks provided by embodiments. Comparing FIG. 3 and FIG. 4, in the top layer on the page, a user space layer, moving left to right, the user space policy governors 314 in CPU user space 302 and the USB4 tunnel policy 316 in USB4 space 304 collectively represent applications that control the CPU (bottom left) via multiple drivers that are located in the middle layer. The middle layer represents a kernel layer or a combined software/firmware layer. The middle layer includes CPU Governor drivers in the OS and CPU side 306 and docking component 104 drivers in the USB4 software/firmware side 308.

The user space policy governors 314 have bidirectional communication with the CPU governor drivers. The USB4 tunnel policy 316 has separate and respective bidirectional communication with the docking component 104 drivers in the USB4 software/firmware side 308, as shown. The docking component 104 drivers can include a PCIe driver, a USB3x driver, a display driver (DD), and a connection manager (CM), and a PCIe bus driver. In a first order conception, respective drivers have a receive/transmit (Rx/Tx) buffer for holding data during the send and receive process.

The bottom layer on the page represents a hardware layer. The left bottom 310 of the page shows the CPU, as may be embodied as the processor 118. In the right bottom 312 of the page, layers of the USB4 hardware to support various adapters and bus protocols are depicted as a protocol adapter layer, a control adapter layer, a transport layer, a logical layer, and an electrical layer. A lane adapter is shown extending across the transport layer, the logical layer, and the electrical layer. A protocol adapter is shown extending across the protocol adapter layer and transport layer, and a control adapter is shown extending across the configuration layer and the transport layer.

As illustrated in FIG. 3, without the enhancements provided by the present disclosure, the PCIe bus driver separately and independently communicates with the PCIe driver, the USB3x driver, the DD, and the CM, as indicated by the bidirectional arrows therebetween. Additionally, as shown in FIG. 3, there is no direct communication between the user space policy governors 314 in CPU user space 302 and the USB4 tunnel policy 316 in the USB4 space 304.

In FIG. 4, new aspects of the present disclosure, embodied generally as the dynamic data scaling module 102, are indicated with arrows that are thicker and filled/shaded grey as compared to FIG. 3. Embodiments of the dynamic data scaling module 102 modify the connection manager (CM) and cause the display driver (DD) to dynamically change the refresh rates of connected DPs, to reduce their periodic BW consumption and release BW for performing an aperiodic task, resulting in a better BW (and hence, data rate or performance) for the aperiodic task. This is described in more detail below.

Looking at the right side of tunnel protocols 400, in the drivers in the USB4 software/firmware side 308, embodiments introduce a handshake between respective drivers. As those with skill in the art will appreciate, the PCIe driver, the USB3x driver, and the DD are associated with respective adapters (and alternately, ports 114) for the peripherals described above. Additionally, the CM driver has a newly dynamic ability to allocate BW among the remaining drivers, as indicated with the thicker arrows.

Tasks and features of the data scaling module 102 may be realized as enhancements to the CM and the DD. As mentioned, the CM establishes tunnels for each bus adapter and populates existing receive/transfer (Rx/Tx) buffers to be transmitted or received by each adapter according to the allocated priority. Within the data scaling module 102 for each adapter, the CM associates the Rx/Tx buffer with a watermark (e.g., a 0/1 flag, or an integer-counter). When the Rx/Tx buffer is filled, the watermark is asserted (e.g., the flag is set to 1, or the counter is incremented). The data scaling module 102 monitors the watermark, and if, for an arbitrary preprogrammed period of time (Tp), the watermark is asserted, this implies the associated Rx/Tx buffer is filled or constantly filled. If the data scaling module 102 determines that the watermark associated with an adapter having a lower/smaller allocated BW than the BW of a selected periodic adapter or endpoint adapter BW, the data scaling module 102 (as enhancements to the CM and DD) can advantageously perform the following:

- The CM can check, for the duration of Tp, if the Rx/Tx buffers on the aperiodic adapters with higher priority are filled above the watermark. If the Rx/Tx buffers are filled below the watermark, the CM can rearrange the BW from the higher priority adapter to the lower one.
- In case of the higher priority adapter is a DP (periodic), the CM can send a request to a display driver (DD) to reduce its BW (to about 50% its starting bandwidth). This creates freed BW.
- The DD can (1) check the applications running on the DP (to determine if the user is keeping the DP static), and (2) calculate a number of static frames per second and corresponding BW and adjust/reduce a starting BW accordingly (e.g., reduce the starting BW if user is keeping the display static), or (3) a combination of (1) and (2).
- The DD can notify the CM of the new (reduced) DP BW.
- The CM can rearrange BW from DP to the aperiodic adapter or adapter with the lower priority. Said differently, the data scaling module 102 can create freed bandwidth; and provide the freed bandwidth to the aperiodic source/adapter of an aperiodic bandwidth request.

Moreover, the reverse process is also possible. If, after having received additional BW, the data scaling module 102 subsequently recognizes that request for boosted BW has ended; this can be determined by determining that the watermark for the associated Tx/Rx buffer for the aperiodic adapter (or adapter with the lower priority) indicates that respective BW consumption has fallen below the previously identified watermark, for the duration of time Tp, the data scaling module 102 (as enhancements to the CM and DD) can do the following:

- Reduce BW to the aperiodic adapter or reduce the BW to the adapter with the lower priority.
- If the higher priority adapter is periodic (e.g., a DP), send a request to DD to restore a previous BW to the DP.
- In addition, the CM can restore a BW to another higher priority adapter (e.g., to a second Dp, or other periodic adapter).

Figure 5:
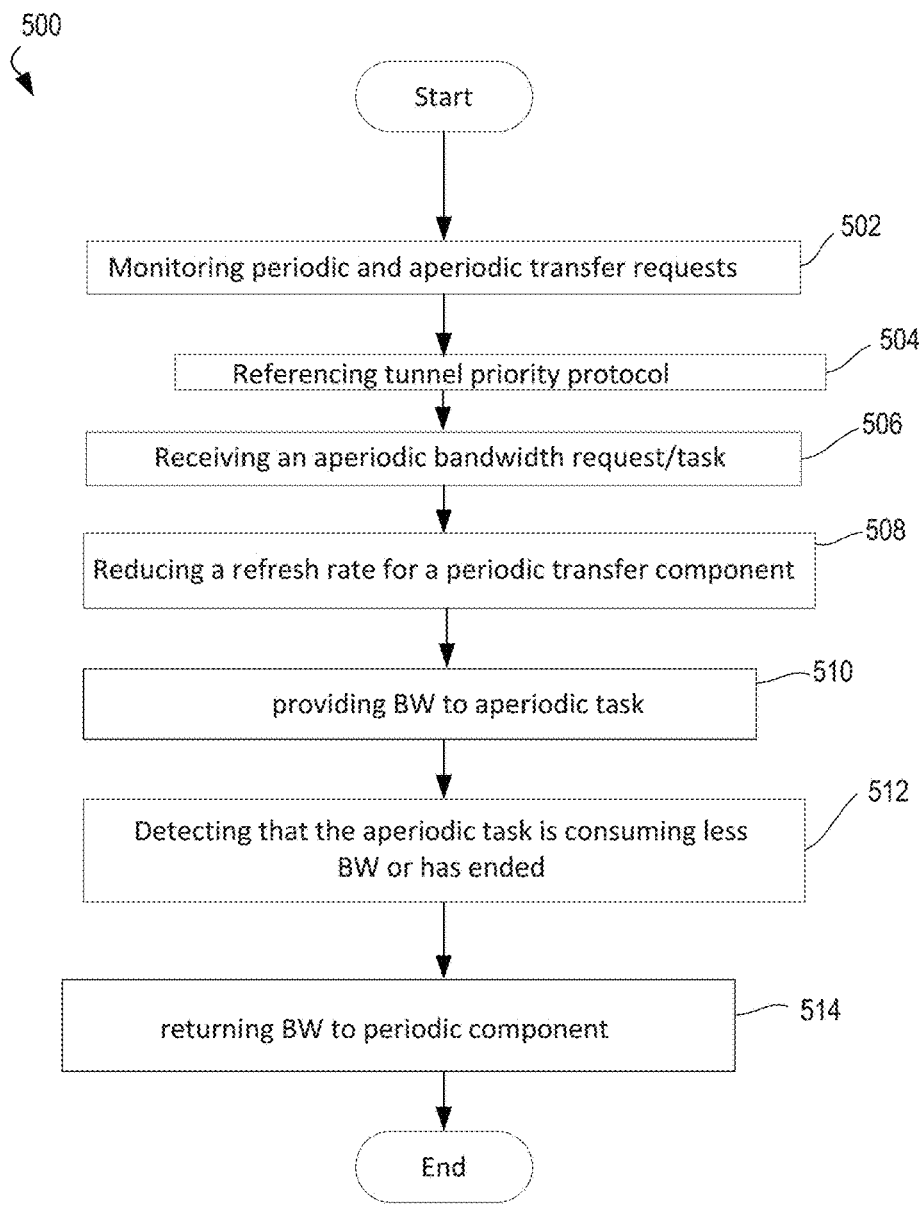
FIG. 5 is an exemplary method as may be performed by embodiments of the present disclosure.

FIG. 5 is a method 500 that data scaling module 102, enhanced by the provided embodiments, may perform. At 502 data scaling module 102 is monitoring periodic and aperiodic transfer requests, filling the Rx/Tx buffers and appending watermarks as described above.

The priority tunneling protocol is referenced at 504, and at 504 BW is allocated in accordance with the tunneling protocol. At 506, a high aperiodic bandwidth request (e.g., in the form of a task or command) is received. At 506 a reduced periodic activity on a connected peripheral may be detected, e.g., for a connected DP consuming USB4 BW for periodic transfers, determining if the display on the DP is being kept static as described above.

At 508, responsive to the determination at 506, the refresh rate for the DP consuming USB4 BW for periodic transfers is reduced (e.g., by about 50%, as described above). At 510, newly freed USB4 BW is provided to the aperiodic task, improving the performance of the tunneled aperiodic task.

At 512, the system 101 or method 500 is determining that BW is available because the tunneled aperiodic task is consuming less BW. (i.e., a relative reduction in BW consumption) and at 514, causes the DD to increase the refresh rate for the DP (i.e., restoring the BW to the DP). In alternate embodiments, the system 101 shall cause the above determined reduced refresh rate at 508 to be permanent or semi-permanent, thereby enabling a user to operate with more CPU/memory affinity.

Additionally, reducing the refresh rate can improve survivability, meaning that the thermal load on an end product (e.g., a computing system or USB docking component) can be reduced, potentially averting a shutdown of performance. The system 101 can also respond to an alert from the CPU that there is a survivability incident and cause the user space policy governors to alert the CM so that the CM shall respond by reducing the display refresh rate or by disconnecting/halting tunnel operations to enhance the platform survivability.

Thus, architectures and methods for USB4 data bandwidth scaling have been provided. The following description illustrates various context for usage and application of provided aspects of the present disclosure.

Figure 6:
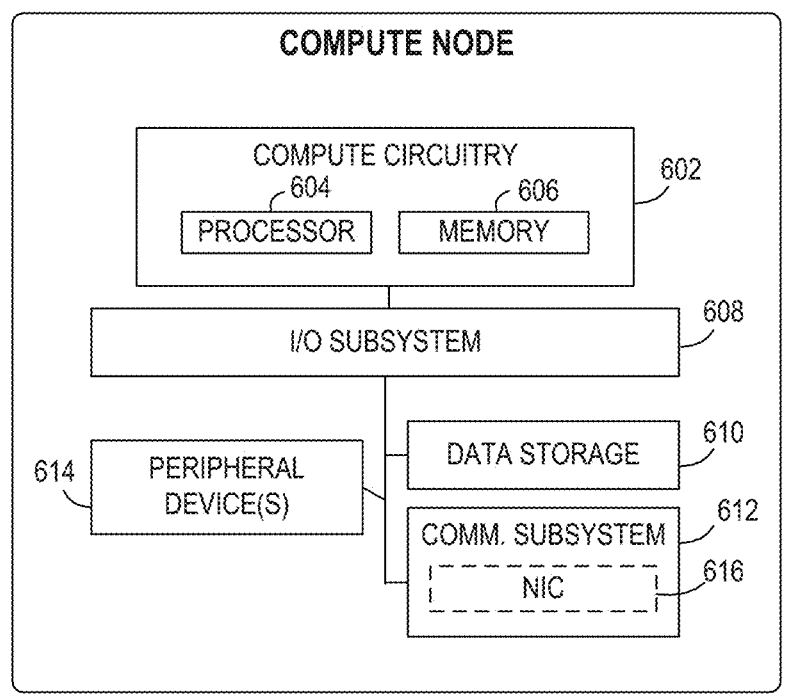
FIG. 6 is a block diagram of an example compute node that may include any of the embodiments disclosed herein.

In the simplified example depicted in FIG. 6, a compute node 600 includes a compute engine (referred to herein as "compute circuitry") 602, an input/output (I/O) subsystem 608, data storage 610, a communication circuitry subsystem 612, and, optionally, one or more peripheral devices 614. With respect to the present example, the compute node 600 or compute circuitry 602 may perform the operations and tasks attributed to the system 101. In other examples, respective compute nodes 600 may include other or additional components, such as those typically found in a computer (e.g., a display, peripheral devices, etc.). Additionally, in some examples, one or more of the illustrative components may be incorporated in, or otherwise form a portion of, another component.

In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 and a memory 606. The processor 604 may be embodied as any type of processor capable of performing the functions described herein (e.g., executing compile functions and executing an application). For example, the processor 604 may be embodied as a multi-core processor(s), a microcontroller, a processing unit, a specialized or special purpose processing unit, or other processor or processing/controlling circuit.

In some examples, the processor 604 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 604 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing, or managing server or data center hardware, managing service meshes, or collecting and distributing telemetry), outside of the CPU or general-purpose processing hardware. However, it will be understood that a xPU, a SOC, a CPU, and other variations of the processor 604 may work in coordination with each other to execute many types of operations and instructions within and on behalf of the compute node 600.

The memory 606 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random-access memory (SRAM). One particular type of DRAM that may be used in a memory module is synchronous dynamic random-access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 606 may be integrated into the processor 604. The memory 606 may store various software and data used during operation such as one or more applications, data operated on by the application(s), libraries, and drivers.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the memory 606, and other components of the compute circuitry 602, into the compute circuitry 602.

The one or more illustrative data storage devices 610 may be embodied as any type of devices configured for short-term or long-term storage of data such as, for example, memory devices and circuits, memory cards, hard disk drives, solid-state drives, or other data storage devices. Individual data storage devices 610 may include a system partition that stores data and firmware code for the data storage device 610. Individual data storage devices 610 may also include one or more operating system partitions that store data files and executables for operating systems depending on, for example, the type of compute node 600.

The communication subsystem 612 may be embodied as any communication circuit, device, transceiver circuit, or collection thereof, capable of enabling communications over a network between the compute circuitry 602 and another compute device (e.g., an edge gateway of an implementing edge computing system).

The communication subsystem 612 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication subsystem 612 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication subsystem 612 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication subsystem 612 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication subsystem 612 may operate in accordance with other wireless protocols in other embodiments. The communication subsystem 612 may include an antenna to facilitate wireless communications and/or to receive other wireless communications (such as AM or FM radio transmissions).

In some embodiments, the communication subsystem 612 may manage wired communications, such as electrical, optical, or any other suitable communication protocols (e.g., IEEE 802.3 Ethernet standards). As noted above, the communication subsystem 612 may include multiple communication components. For instance, a first communication subsystem 612 may be dedicated to shorter-range wireless communications such as Wi-Fi or Bluetooth, and a second communication subsystem 612 may be dedicated to longer-range wireless communications such as global positioning system (GPS), EDGE, GPRS, CDMA, WiMAX, LTE, EV-DO, or others. In some embodiments, a first communication subsystem 612 may be dedicated to wireless communications, and a second communication subsystem 612 may be dedicated to wired communications.

The illustrative communication subsystem 612 includes an optional network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node). In some examples, the NIC 620 may be embodied as part of a system-on-a-chip (SoC) that includes one or more processors or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally, or alternatively, in such examples, the local memory of the NIC 620 may be integrated into one or more components of the client compute node at the board level, socket level, chip level, and/or other levels.

Additionally, in some examples, a respective compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node (whether a client, gateway, or aggregation node) in an edge computing system or like forms of appliances, computers, subsystems, circuitry, or other components.

In other examples, the compute node 600 may be embodied as any type of device or collection of devices capable of performing various compute functions. Respective compute nodes 600 may be embodied as a type of device, appliance, computer, or other "thing" capable of communicating with other compute nodes that may be edge, networking, or endpoint components. For example, a compute device may be embodied as a personal computer, server, smartphone, a mobile compute device, a smart appliance, smart camera, an in-vehicle compute system (e.g., a navigation system), a weatherproof or weather-sealed computing appliance, a self-contained device within an outer case, shell, etc., or other device or system capable of performing the described functions.

Figure 7:
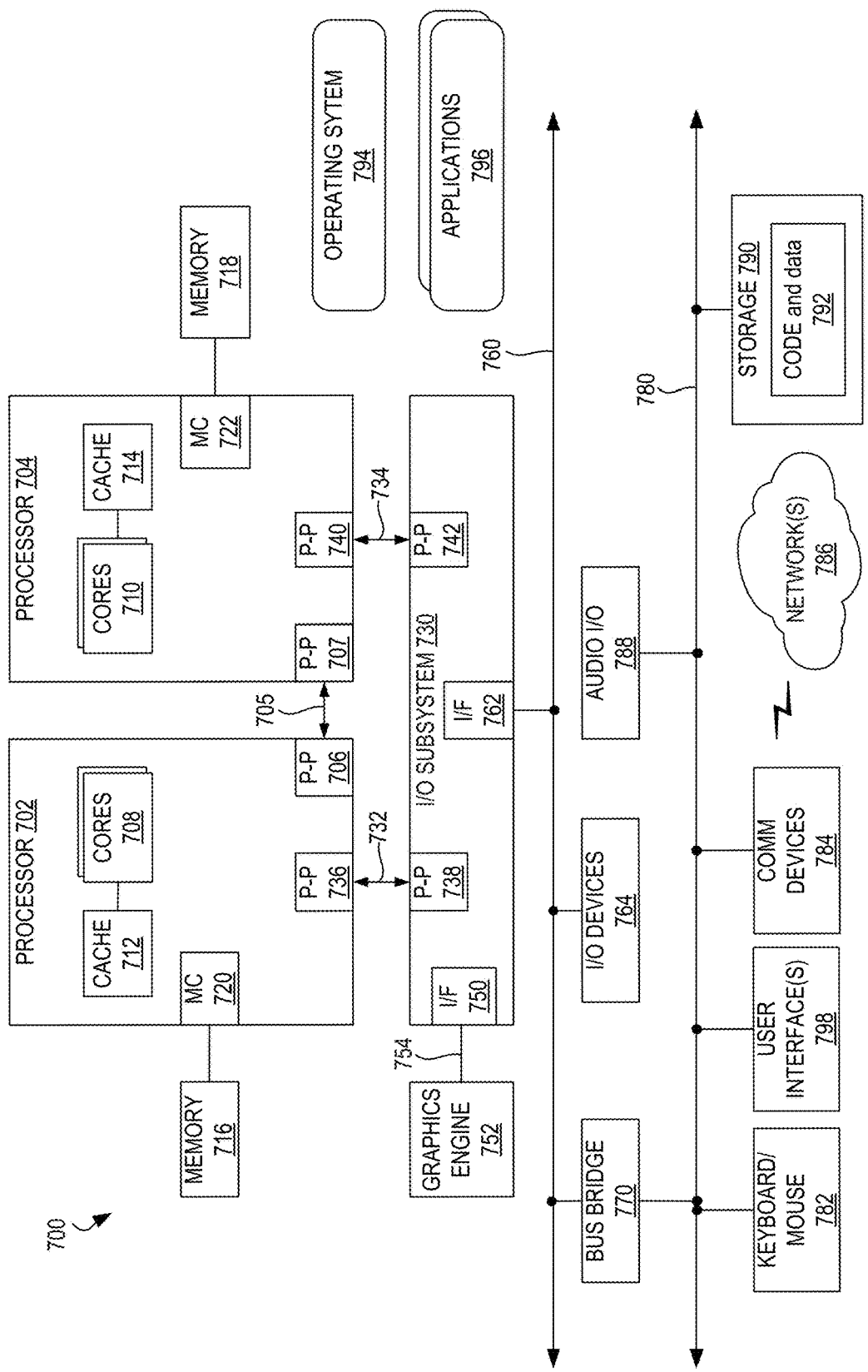
FIG. 7 illustrates a multi-processor environment in which embodiments may be implemented.

FIG. 7 illustrates a multi-processor environment in which embodiments may be implemented. Processor units 702 and 704 further comprise cache memories 712 and 714, respectively. The cache memories 712 and 714 can store data (e.g., instructions) utilized by one or more components of the processor units 702 and 704, such as the processor cores 708 and 710. The cache memories 712 and 714 can be part of a memory hierarchy for the computing system 700. For example, the cache memories 712 can locally store data that is also stored in a memory 716 to allow for faster access to the data by the processor unit 702. In some embodiments, the cache memories 712 and 714 can comprise multiple cache levels, such as level 1 (L1), level 2 (L2), level 3 (L3), level 4 (L4) and/or other caches or cache levels. In some embodiments, one or more levels of cache memory (e.g., L2, L3, L4) can be shared among multiple cores in a processor unit or among multiple processor units in an integrated circuit component. In some embodiments, the last level of cache memory on an integrated circuit component can be referred to as a last level cache (LLC). One or more of the higher levels of cache levels (the smaller and faster caches) in the memory hierarchy can be located on the same integrated circuit die as a processor core and one or more of the lower cache levels (the larger and slower caches) can be located on an integrated circuit dies that are physically separate from the processor core integrated circuit dies.

Although the computing system 700 is shown with two processor units, the computing system 700 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 700 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 702 and 704 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetric can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 702 and 704 further comprise memory controller logic (MC) 720 and 722. As shown in FIG. 7, MCs 720 and 622 control memories 716 and 718 coupled to the processor units 702 and 704, respectively. The memories 716 and 718 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 720 and 722 are illustrated as being integrated into the processor units 702 and 704, in alternative embodiments, the MCs can be external to a processor unit.

Processor units 702 and 704 are coupled to an Input/Output (I/O) subsystem 730 via point-to-point interconnections 732 and 734. The point-to-point interconnection 732 connects a point-to-point interface 736 of the processor unit 702 with a point-to-point interface 738 of the I/O subsystem 730, and the point-to-point interconnection 734 connects a point-to-point interface 740 of the processor unit 704 with a point-to-point interface 742 of the I/O subsystem 730. Input/Output subsystem 730 further includes an interface 750 to couple the I/O subsystem 730 to a graphics engine 752. The I/O subsystem 730 and the graphics engine 752 are coupled via a bus 754.

The Input/Output subsystem 730 is further coupled to a first bus 760 via an interface 762. The first bus 760 can be a Peripheral Component Interconnect Express (PCIe) bus or any other type of bus. Various I/O devices 764 can be coupled to the first bus 760. A bus bridge 770 can couple the first bus 760 to a second bus 780. In some embodiments, the second bus 780 can be a low pin count (LPC) bus. Various devices can be coupled to the second bus 780 including, for example, a keyboard/mouse 782, audio I/O devices 788, and a storage device 790, such as a hard disk drive, solid-state drive, or another storage device for storing computer-executable instructions (code) 792 or data. The code 792 can comprise computer-executable instructions for performing methods described herein. Additional components that can be coupled to the second bus 780 include communication device(s) 784, which can provide for communication between the computing system 700 and one or more wired or wireless networks 786 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 784 support wireless communication, the communication devices 784 can comprise wireless communication components coupled to one or more antennas to support communication between the computing system 700 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 700 can comprise removable memory such as flash memory cards (e.g., SD (Secure Digital) cards), memory sticks, Subscriber Identity Module (SIM) cards). The memory in system 700 (including caches 712 and 714, memories 716 and 718, and storage device 790) can store data and/or computer-executable instructions for executing an operating system 794 and application programs 796. Example data includes web pages, text messages, images, sound files, and video data biometric thresholds for particular users or other data sets to be sent to and/or received from one or more network servers or other devices by the system 700 via the one or more wired or wireless networks 786, or for use by the system 700. The system 700 can also have access to external memory or storage (not shown) such as external hard drives or cloud-based storage.

The operating system 794 (also simplified to "OS" herein) can control the allocation and usage of the components illustrated in FIG. 6 and support the one or more application programs 696. The application programs 796 can include common computing system applications (e.g., email applications, calendars, contact managers, web browsers, messaging applications) as well as other computing applications.

[hypervisors] In some embodiments, a hypervisor (or virtual machine manager) operates on the operating system 794 and the application programs 796 operate within one or more virtual machines operating on the hypervisor. In these embodiments, the hypervisor is a type-2 or hosted hypervisor as it is running on the operating system 794. In other hypervisor-based embodiments, the hypervisor is a type-1 or "bare-metal" hypervisor that runs directly on the platform resources of the computing system 794 without an intervening operating system layer.

[containers] In some embodiments, the applications 796 can operate within one or more containers. A container is a running instance of a container image, which is a package of binary images for one or more of the applications 796 and any libraries, configuration settings, and any other information that one or more applications 796 need for execution. A container image can conform to any container image format, such as Docker®, Appc, or LXC container image formats. In container-based embodiments, a container runtime engine, such as Docker Engine, LXU, or an open container initiative (OCI)-compatible container runtime (e.g., Railcar, CRI-O) operates on the operating system (or virtual machine monitor) to provide an interface between the containers and the operating system 794. An orchestrator can be responsible for management of the computing system 700 and various container-related tasks such as deploying container images to the computing system 794, monitoring the performance of deployed containers, and monitoring the utilization of the resources of the computing system 794.

The computing system 700 can support various additional input devices, represented generally as user interfaces 798, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 700. External input and output devices can communicate with the system 700 via wired or wireless connections.

In addition, one or more of the user interfaces 798 may be natural user interfaces (NUIs). For example, the operating system 794 or applications 796 can comprise speech recognition logic as part of a voice user interface that allows a user to operate the system 700 via voice commands. Further, the computing system 700 can comprise input devices and logic that allows a user to interact with computing the system 700 via body, hand or face gestures. For example, a user's hand gestures can be detected and interpreted to provide input to a gaming application.

The I/O devices 764 can include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 700 can further comprise one or more additional antennas coupled to one or more additional receivers, transmitters, and/or transceivers to enable additional functions.

[interconnections] In addition to those already discussed, integrated circuit components, integrated circuit constituent components, and other components in the computing system 794 can communicate with interconnect technologies such as Intel® QuickPath Interconnect (QPI), Intel® Ultra Path Interconnect (UPI), Computer Express Link (CXL), cache coherent interconnect for accelerators (CCIX®), serializer/deserializer (SERDES), Nvidia® NVLink, ARM Infinity Link, Gen-Z. or Open Coherent Accelerator Processor Interface (OpenCAPI). Other interconnect technologies may be used and a computing system 694 may utilize more or more interconnect technologies.

It is to be understood that FIG. 7 illustrates only one example computing system architecture. Computing systems based on alternative architectures can be used to implement technologies described herein. For example, instead of the processors 702 and 704 and the graphics engine 752 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 7. Moreover, the illustrated components in FIG. 7 are not required or all-inclusive, as shown components can be removed and other components added in alternative embodiments.

Figure 8:
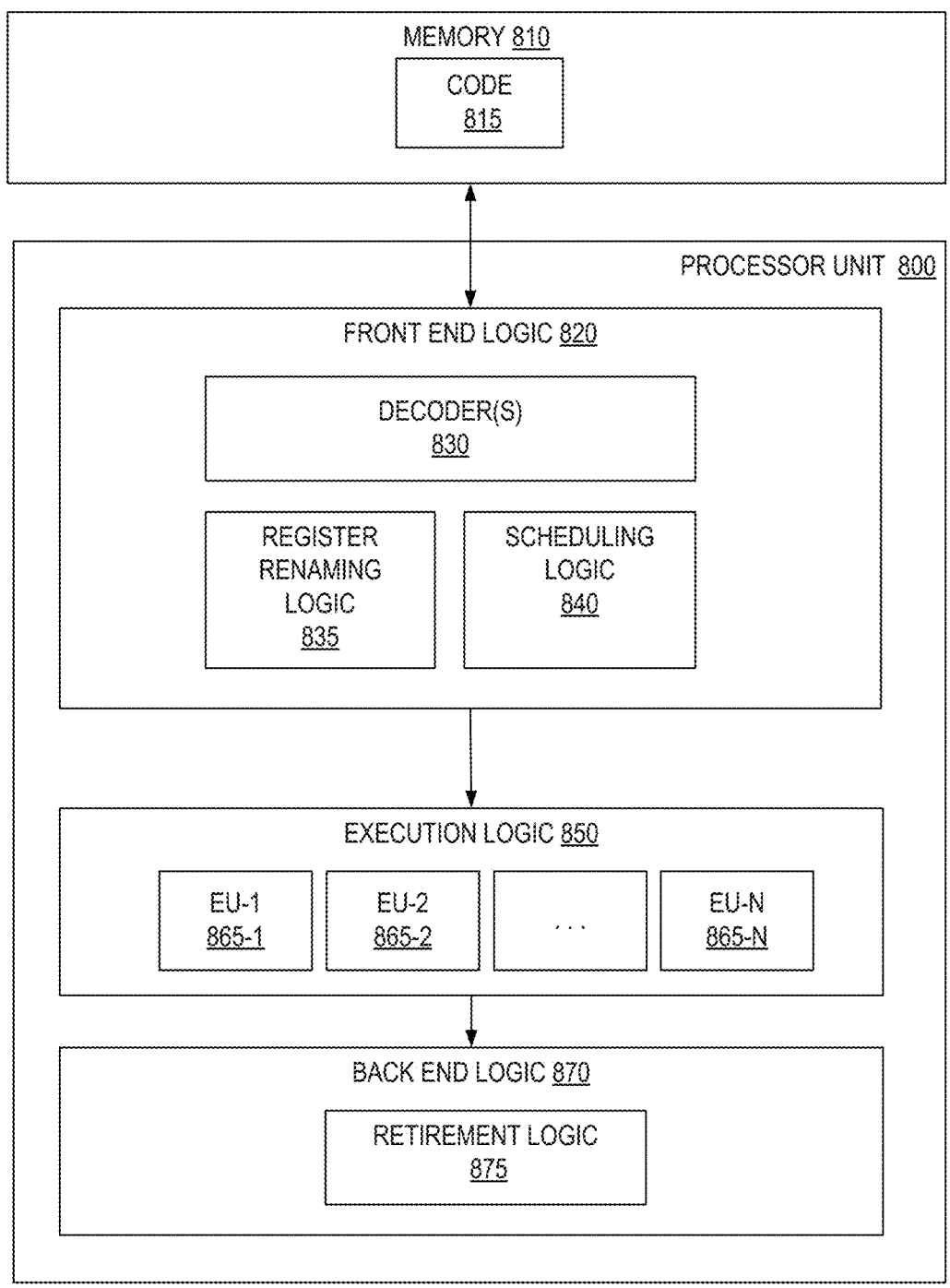
FIG. 8 is a block diagram of an example processor unit to execute computer-executable instructions as part of implementing technologies described herein.

FIG. 8 is a block diagram of an example processor unit 800 to execute computer-executable instructions as part of implementing technologies described herein. The processor unit 800 can be a single-threaded core or a multithreaded core in that it may include more than one hardware thread context (or "logical processor") per processor unit.

FIG. 8 also illustrates a memory 810 coupled to the processor unit 800. The memory 810 can be any memory described herein or any other memory known to those of skill in the art. The memory 810 can store computer-executable instructions 815 (code) executable by the processor unit 800.

The processor unit comprises front-end logic 820 that receives instructions from the memory 810. An instruction can be processed by one or more decoders 830. The decoder 830 can generate as its output a micro-operation such as a fixed width micro-operation in a predefined format, or generate other instructions, microinstructions, or control signals, which reflect the original code instruction. The front-end logic 820 further comprises register renaming logic 835 and scheduling logic 840, which generally allocate resources and queues operations corresponding to converting an instruction for execution.

The processor unit 800 further comprises execution logic 850, which comprises one or more execution units (EUs) 865-1 through 865-N. Some processor unit embodiments can include a few execution units dedicated to specific functions or sets of functions. Other embodiments can include only one execution unit or one execution unit that can perform a particular function. The execution logic 850 performs the operations specified by code instructions. After completion of execution of the operations specified by the code instructions, back-end logic 870 retires instructions using retirement logic 875. In some embodiments, the processor unit 800 allows out of order execution but requires in-order retirement of instructions. Retirement logic 875 can take a variety of forms as known to those of skill in the art (e.g., re-order buffers or the like).

The processor unit 800 is transformed during execution of instructions, at least in terms of the output generated by the decoder 830, hardware registers and tables utilized by the register renaming logic 835, and any registers (not shown) modified by the execution logic 850.

While at least one embodiment has been presented in the foregoing detailed description, it should be appreciated that a vast number of variations exist. It should also be appreciated that the disclosed embodiments are only examples, and are not intended to limit the scope, applicability, or configuration of the disclosure in any way. Rather, the foregoing detailed description will provide those skilled in the art with a convenient road map for implementing the disclosed aspects of the present disclosure. Various changes can be made in the function and arrangement of elements without departing from the scope of the disclosure as set forth in the appended claims and the legal equivalents thereof.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system, device, or machine described or mentioned herein as well as any other computing system, device, or machine capable of executing instructions. Thus, the term "computer-executable instruction" refers to instructions that can be executed by any computing system, device, or machine described or mentioned herein as well as any other computing system, device, or machine capable of executing instructions.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

Additionally, theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

As used herein, phrases such as "embodiments," "an aspect of the present disclosure," "various aspects of the present disclosure," "some aspects of the present disclosure," and the like, indicate that some aspects of the present disclosure may have some, all, or none of the features described for other aspects of the present disclosure. "First," "second," "third," and the like describe a common object and indicate different instances of like objects being referred to; unless specifically stated, they do not imply a given sequence, either temporally or spatially, in ranking, or any other manner. In accordance with patent application parlance, "connected" indicates elements that are in direct physical or electrical contact with each other and "coupled" indicates elements that co-operate or interact with each other, coupled elements may or may not be in direct physical or electrical contact. Furthermore, the terms "comprising," "including," "having," and the like, are utilized synonymously to denote non-exclusive inclusions.

As used in this application and the claims, a list of items joined by the term "at least one of" can mean any combination of the listed terms. For example, the phrase "at least one of A, B and C" can mean A; B; C; A and B; A and C; B and C; or A, B, and C. Similarly, as used in this application and the claims, a list of items joined by the term "one or more of" can mean any combination of the listed terms. For example, the phrase "one or more of A, B and C" can mean A; B; C; A and B; A and C; B and C; or A, B, and C.

The following Examples pertain to additional aspects of the present disclosure of technologies disclosed herein.

Example 1 is an apparatus comprising: a USB4 docking component; a display panel (DP) operably connected to the USB4 docking component; a source of an aperiodic bandwidth request operably connected to the USB4 docking component; a processor operably connected to the USB4 docking component; a module executable by the processor to: cause the DP to operate at a refresh rate; receive the aperiodic bandwidth request; reduce the refresh rate by about fifty percent responsive to the aperiodic bandwidth request, thereby creating freed bandwidth; and provide the freed bandwidth to the source of the aperiodic bandwidth request.

Example 2 includes the subject matter of Example 1, wherein the module is further to determine that the aperiodic bandwidth request has ended.

Example 3 includes the subject matter of Example 2, wherein the module is further to restore the refresh rate of the DP responsive to determining that the aperiodic bandwidth request has ended.

Example 4 includes the subject matter of Example 1, wherein the module is further to rearrange bandwidth between the DP and the source of the aperiodic bandwidth request as a function of respective priorities of the DP and the source of the aperiodic bandwidth request.

Example 5 includes the subject matter of Example 1 wherein the module is further to determine if a display on the DP is static.

Example 6 includes the subject matter of Example 1, wherein the module is further to rearrange bandwidth between the DP and the source of the aperiodic bandwidth request as a function of an application running on the DP.

Example 7 includes the subject matter of Example 1, wherein the source of the aperiodic bandwidth request is a first source, and further comprising: a second source of a second aperiodic bandwidth request, operably connected to the USB4 docking component; and wherein the module is further to: determine a priority of the first source and a priority of the second source; determine a first number of occurrences of filling a first buffer associated with the first source in a predetermined amount of time; determine a second number of occurrences of filling a second buffer associated with the second source in the predetermined amount of time; and rearrange bandwidth between the first source and the second source as a function of the priority of the first source, the priority of the second source, the first number and the second number.

Example 8 is a method comprising,
at a processor in operable communication with a universal serial bus 4 (USB4) docking component,
executing a data scaling module; causing a display panel (DP) operably connected to the USB4 docking to operate at a refresh rate; receiving an aperiodic bandwidth request from a source of the aperiodic bandwidth request; reducing the refresh rate by about fifty percent responsive to the aperiodic bandwidth request, thereby creating freed bandwidth; and providing the freed bandwidth to the source of the aperiodic bandwidth request.

Example 9 includes the subject matter of Example 8, further comprising determining that the aperiodic bandwidth request has ended.

Example 10 includes the subject matter of Example 9, further comprising restoring the refresh rate of the DP responsive to determining that the aperiodic bandwidth request has ended.

Example 11 includes the subject matter of Example 8, further comprising rearranging bandwidth between the DP and the source of the aperiodic bandwidth request as a function of respective priorities of the DP and the source of the aperiodic bandwidth request.

Example 12 includes the subject matter of Example 8, further comprising determining if a display on the DP is static.

Example 13 includes the subject matter of Example 8, further comprising, rearranging bandwidth between the DP and the source of the aperiodic bandwidth request as a function of an application running on the DP.

Example 14 includes the subject matter of Example 8, wherein the source of the aperiodic bandwidth request is a first source, and further comprising: a second source of a second aperiodic bandwidth request, operably connected to the USB4 docking component; and further comprising: determining a priority of the first source and a priority of the second source; determining a first number of occurrences of filling a first buffer associated with the first source in a predetermined amount of time; determining a second number of occurrences of filling a second buffer associated with the second source in the predetermined amount of time; and rearranging bandwidth between the first source and the second source as a function of the priority of the first source, the priority of the second source, the first number and the second number.

Example 15 includes one or more machine readable storage media having instructions stored thereon, the instructions when executed by a machine are to cause the machine to: execute a data scaling module associated with a universal serial bus 4 (USB4) docking component; cause a display panel (DP) operably connected to the USB4 docking to operate at a refresh rate; receive an aperiodic bandwidth request from a source of the aperiodic bandwidth request; reduce the refresh rate by about fifty percent responsive to the aperiodic bandwidth request, thereby creating freed bandwidth; and provide the freed bandwidth to the source of the aperiodic bandwidth request.

Example 16 includes the subject matter of Example 15, wherein the instructions, when executed by the machine, are to cause the machine further to determine that the aperiodic bandwidth request has ended.

Example 17 includes the subject matter of Example 16, wherein the instructions, when executed by the machine, are to cause the machine further to restore the refresh rate of the DP responsive to determining that the aperiodic bandwidth request has ended.

Example 18 includes the subject matter of Example 17, wherein the instructions, when executed by the machine, are to cause the machine further to rearrange bandwidth between the DP and the source of the aperiodic bandwidth request as a function of respective priorities of the DP and the source of the aperiodic bandwidth request.

Example 19 includes the subject matter of Example 17, wherein the instructions, when executed by the machine, are to cause the machine further to determine if a display on the DP is static.

Example 20 includes the subject matter of Example 17, wherein the instructions, when executed by the machine, are to cause the machine further to, rearrange bandwidth between the DP and the source of the aperiodic bandwidth request as a function of an application running on the DP.

What is claimed is:

1. An apparatus comprising:
a universal serial bus 4 (USB4) docking component;
a display panel (DP) operably connected to the USB4 docking component;
a source of an aperiodic bandwidth request operably connected to the USB4 docking component;
a processor operably connected to the USB4 docking component; and
instructions executable by the processor to:
  cause the DP to operate at a refresh rate;
  receive the aperiodic bandwidth request;
  reduce the refresh rate responsive to the aperiodic bandwidth request to create freed bandwidth; and
  provide the freed bandwidth to the source of the aperiodic bandwidth request;
  wherein the instructions further cause the processor to determine that the aperiodic bandwidth request has ended.

2. The apparatus of claim 1, wherein the instructions further cause the processor to restore the refresh rate of the DP responsive to determining that the aperiodic bandwidth request has ended.

3. The apparatus of claim 1, wherein the instructions are further to rearrange bandwidth between the DP and the source of the aperiodic bandwidth request as a function of respective priorities of the DP and the source of the aperiodic bandwidth request.

4. The apparatus of claim 1 wherein the instructions are further to determine if a display on the DP is static.

5. The apparatus of claim 1, wherein the instructions are further to rearrange bandwidth between the DP and the source of the aperiodic bandwidth request as a function of an application running on the DP.

6. The apparatus of claim 1, wherein the source of the aperiodic bandwidth request is a first source, and further comprising:
a second source of a second aperiodic bandwidth request, operably connected to the USB4 docking component; and
wherein the instructions further cause the processor to:
  determine a first priority of the first source and a second priority of the second source;
  determine a first number of occurrences of filling a first buffer associated with the first source in a predetermined amount of time;
  determine a second number of occurrences of filling a second buffer associated with the second source in the predetermined amount of time; and
  rearrange bandwidth between the first source and the second source as a function of the first priority, the second priority, the first number and the second number.

7. An apparatus comprising:
a universal serial bus 4 (USB4) docking component having operably connected thereto a display panel (DP) and a source of an aperiodic bandwidth request;
a means for causing the DP to operate at a refresh rate;
a means for receiving the aperiodic bandwidth request from the source of the aperiodic bandwidth request;
a means for reducing the refresh rate fifty percent responsive to the aperiodic bandwidth request, thereby creating freed bandwidth;
a means for providing the freed bandwidth to the source of the aperiodic bandwidth request; and
a means for determining that the aperiodic bandwidth request has ended.

8. The apparatus of claim 7, further comprising a means for restoring the refresh rate of the DP responsive to determining that the aperiodic bandwidth request has ended.

9. The apparatus of claim 7, further comprising a means for rearranging bandwidth between the DP and the source of the aperiodic bandwidth request as a function of respective priorities of the DP and the source of the aperiodic bandwidth request.

10. The apparatus of claim 7, further comprising a means for determining if a display on the DP is static.

11. The apparatus of claim 7, further comprising a means for rearranging bandwidth between the DP and the source of the aperiodic bandwidth request as a function of an application running on the DP.

12. The apparatus of claim 7, wherein the source of the aperiodic bandwidth request is a first source, and further comprising a means for:
- identifying a second source of a second aperiodic bandwidth request, operably connected to the USB4 docking component;
- determining a priority of the first source and a priority of the second source;
- determining a first number of occurrences of filling a first buffer associated with the first source in a predetermined amount of time;
- determining a second number of occurrences of filling a second buffer associated with the second source in the predetermined amount of time; and
- rearranging bandwidth between the first source and the second source as a function of the priority of the first source, the priority of the second source, the first number and the second number.

13. One or more non-transitory machine readable storage media having instructions stored thereon, the instructions when executed by a machine are to cause the machine to:
- execute a data scaling module associated with a universal serial bus 4 (USB4) docking component;
- cause a display panel (DP) operably connected to the USB4 docking to operate at a refresh rate;
- receive an aperiodic bandwidth request from a source of the aperiodic bandwidth request; and
- reduce the refresh rate responsive to the aperiodic bandwidth request, thereby creating freed bandwidth;
- provide the freed bandwidth to the source of the aperiodic bandwidth request; and
- cause the machine further to determine that the aperiodic bandwidth request has ended.

14. The one or more non-transitory machine readable storage media of claim 13, wherein the instructions, when executed by the machine, are to cause the machine further to restore the refresh rate of the DP responsive to determining that the aperiodic bandwidth request has ended.

15. The one or more non-transitory machine readable storage media of claim 14, wherein the instructions, when executed by the machine, are to cause the machine further to rearrange bandwidth between the DP and the source of the aperiodic bandwidth request as a function of respective priorities of the DP and the source of the aperiodic bandwidth request.

16. The one or more non-transitory machine readable storage media of claim 14, wherein the instructions, when executed by the machine, are to cause the machine further to determine if a display on the DP is static.

17. The one or more non-transitory machine readable storage media of claim 14, wherein the instructions, when executed by the machine, are to cause the machine further to, rearrange bandwidth between the DP and the source of the aperiodic bandwidth request as a function of an application running on the DP.

* * * * *